Nov. 17, 1964   W. D. WHITE, JR   3,156,968
PRESSURE ROLLER AND METHOD OF MANUFACTURE
Filed March 22, 1962
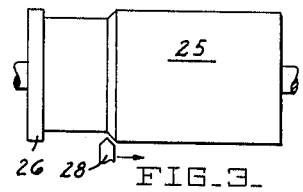
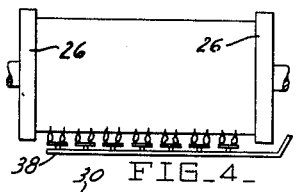
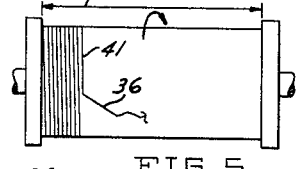
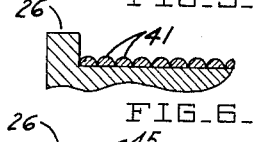
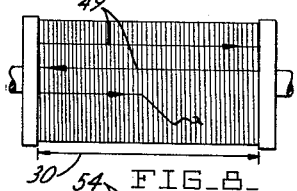
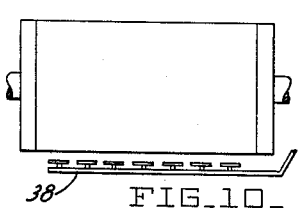
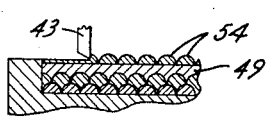
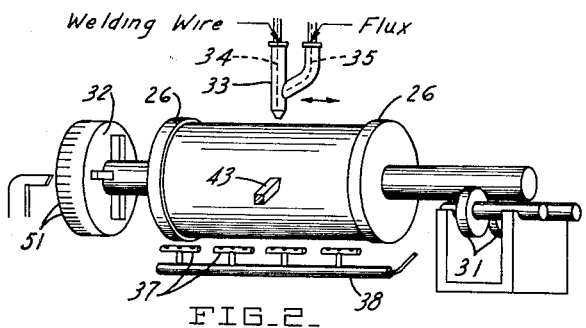
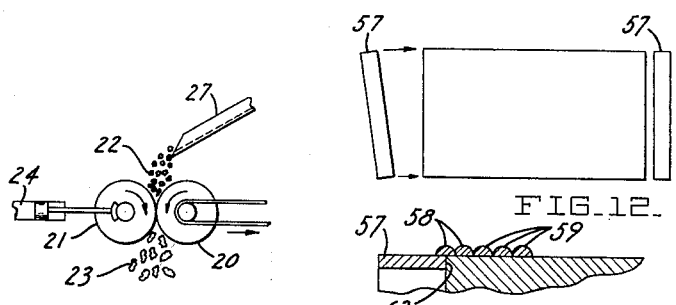
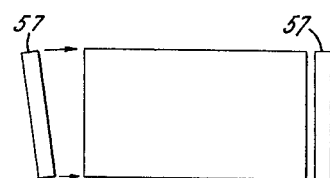
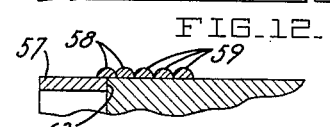
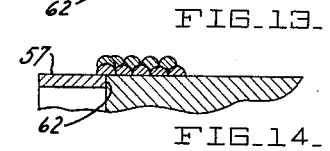
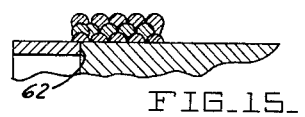
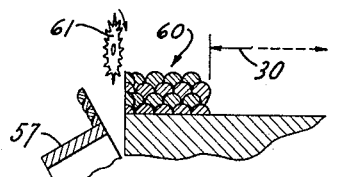
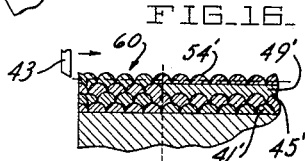
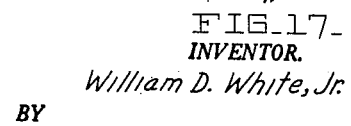
INVENTOR.
William D. White, Jr.
BY
Flehr and Swain
ATTORNEYS.

United States Patent Office 3,156,968
Patented Nov. 17, 1964

3,156,968
PRESSURE ROLLER AND METHOD OF
MANUFACTURE
William D. White, Jr., 148 Dracena Ave.,
Piedmont, Calif.
Filed Mar. 22, 1962, Ser. No. 181,701
13 Claims. (Cl. 29—123)

This invention relates to pressure rollers and to a method of preparing same. More particularly this invention pertains to such a roller prepared with an improved rolling surface particularly useful in compressing vegetable matter such as copra and various grains into thin wafer-like flakes, in the nature of corn flakes, for example.

In "flaking" operations, a pair of "flaking" rolls serve to compress vegetable matter prior to subsequent chemical treatment to extract, for example, oils from the flakes of material. An increase in flake thickness decreases the yield substantially. Therefore, it is desirable that the cylindrical, or rolling surfaces wear away evenly along their entire length. It is also desirable that the surface should wear away without forming eroded areas into which the material being fed can escape to avoid the full compression of the rolls. Feeding of loose material to the rollers, as done in "flaking" operations has further tended to concentrate wear upon the middle section of the rolling surfaces thereby aggravating the problem.

Therefore, it is an object of the present invention to provide a pressure roller and method of making same wherein the rolling surfaces tend to wear evenly along the axial length thereof.

Another object of the present invention is the provision of an improved rolling surface for compressing loose materials and a method of applying such a surface whereby development of objectionable eroded wear patterns thereon is minimized.

Further objects and features of the invention will appear from the following description in which a preferred embodiment has been set forth in detail in conjunction with the accompanying drawings.

Referring to the drawings:

FIGURE 1 is a schematic end view showing a "flaking" operation.

FIGURE 2 is a schematic perspective view showing a preferred way of handling a roller for preparation of the surface thereof.

FIGURES 3–11 diagrammatically represent steps in preparing a roller surface according to the invention.

FIGURES 12–17 diagrammatically represent steps of another embodiment according to the invention.

A "flaking" operation for compressing copra, for example, is schematically shown in FIGURE 1 wherein a driving and a driven roller 20, 21 respectively are arranged to turn in rolling contact. The copra 22, in shredded or ground form, is fed to one side of the rollers by a chute 27 and ejected from the other side as wafer-like flakes 23. Compressive force is applied between the rolls 20, 21 by suitable means such as a pair of hydraulic rams 24 acting on the ends of the axle of one of the solid steel rollers. A typical roller runs about 42 inches long and 21 inches in diameter.

Rollers 20, 21 are preferably prepared from a forged, solid steel right cylindrical mandrel 25 formed with a stub shaft at each end. For flaking copra, a forty carbon steel mandrel can be used. Although a forged piece is somewhat preferred for its denser grain structure and fewer flaws, a casting can also be used. The mandrel 25 is rotated slowly while an intermediate axial extent is machined away by a suitable tool 28 to a substantially uniform depth (FIGURE 3). In the above typical instance this is on the order of approximately one-half inch, thereby leaving a narrow cylindrical band or flange 26 at each end, for example, of about an inch in width. The relieved axial portion 30 is then filled in with a welding material in a particular manner to provide a rolling surface strongly resistant to development of eroded wear patterns. As thus prepared, the intermediate axial extent 30 when taken with the end bands 26 gives an even wearing roller throughout the entire length thereof.

To "fill in" the relieved portion of the mandrel, a number of beads of weld material are applied in side by side contiguity to form a cylindrical "corrugated" layer thereof on the mandrel. As schematically shown in FIGURE 2, one way of handling the mandrel for welding is to rest one stub shaft upon a pair of rollers 31 and mount the other shaft in a rotatably driven chuck 32. While various welding techniques such as heliarc welding can be used, I prefer to use submerged arc welding equipment wherein a motor-driven traveling head 33 is employed under the control of manually operated switches. A welding wire 34 and a welding flux material 35 are simultaneously fed to the head and the welding "bead" is formed under a blanket of flux, i.e. "submerged."

Before welding, however, it has been found advantageous to heat the roller up to approximately 600° F. (FIGURE 4). This can be done, as schematically shown in FIGURE 2, by locating a number of gas burners 37 served by a manifold 38 disposed along the length of the roller. When the mandrel has been brought up to temperature the welding head 33 is lowered into welding relation with the relieved portion of the mandrel, starting for example at one end thereof. If desired, the path defined by movement of the head with respect to the roller can be "masked" off, or exposed, while the rest of the mandrel is cloaked with asbestos sheets so as to "contain" the heat about the mandrel. Use of a suitable framework around the workpiece will provide the necessary clearance for rotation of the mandrel. The chuck 32 is slowly rotated while a "bead" 41 approximately ⅛" in depth is applied. This is schematically represented by a single welding rod 36 in FIGURE 5. Before laying down a contiguous bead the slag and flux covering on the preceding bead ought to be removed. It has been found that a period of cooling equivalent to roughly three-quarters of a revolution allows a scraping tool 43 to be placed in position to remove the slag covering. Thus, near the end of each revolution, the head 33 can be axially shifted one bead width to apply another bead of weld material adjacent and contiguous to the first, and so on, continuously until a generally cylindrically shaped layer of beads has been applied. The welding wire used should give a bead harder than the end flanges. Therefore, where the mandrel is forty carbon steel as indicated in the above example for flaking ground copra, a hard facing alloy welding wire can be used. One suitable wire for instance is made up of the following percentages of materials: 0.50 carbon, 1.40 manganese, 0.70 silicon, 4.70 chromium, 0.60 molybdenum, 0.50 vanadium and a balance of iron.

A second layer (FIGURE 7) similar to the first is thereafter applied with the beads 45 substantially overlying the boundary crevices 46 between adjacent beads of the first layer.

Having applied two layers of welding beads extending transversely of the axis of the roller, a third layer of welding beads 49 is put on with the beads thereof crossing over the previous beads, for example at right angles so as to lie lengthwise of the roller.

With equipment such as represented in FIGURE 2, this can be done most quickly by applying a bead 49 axially along one direction and co-extensive with the relieved portion 30. As with previous layers, the beads of the third layer are approximately ⅛" deep. After laying down the first lengthwise bead, the chuck is rotated a number of bead widths, for example, four widths equivalent to an angle as represented by discrete scribe marks 51 on the chuck. The next longitudinal bead is then applied along a direction opposite to the first, followed again by rotation of the mandrel through a predetermined angle. The foregoing procedure continues through a complete revolution of the mandrel. The slag or flux "covering" is then removed from each of the axial beads and an adjacent bead laid down next to each. Thus, after four revolutions of the mandrel, in the example, the third layer is complete. The foregoing procedure has proved an economical use of time and accordingly is preferred particularly when using the above type of welding.

To facilitate machining a smooth rolling surface, the "corrugated" nature of the third layer is covered over with a fourth layer of circumferentially extending welding beads 54 applied in the manner of the first and second layers. The heat is maintained (FIGURE 10) on the order of 600° F. for a short period on the order of two hours followed by gradual cooling. This heating has been found advantageous although not entirely necessary. It has been observed that the additional heating period seems to relieve stresses in the metal structure thereby providing an improved rolling surface.

After the mandrel has cooled, it is machined or ground smooth along its entire length (FIGURE 11), followed by machining bearing surfaces on each shaft coaxially with the prepared rolling surface of the mandrel.

Rollers, as thus prepared by the steps generally of, forming a cylindrical mandrel to provide end flanges thereon, applying a plurality of layers of welding beads wherein the beads of one layer extend transversely to the beads of another layer, and smoothing the exterior applied layer and end flanges into a single continuous cylindrical surface, have been found to wear evenly from end to end and without objectionable wear patterns developing on the rolling surface.

The end bands 26 can also be constructed or renewed by application of circumferential beads. To build up the end bands, a number of layers of welding bead can be applied until sufficient flange height has been achieved. The welding material for the built-up flanges ought to be soft enough to wear away faster than the intermediate axial extent of the roller. Where the welding material for the portion between the flanges is comprised as noted above, a sixty-five carbon steel welding wire material provides a satisfactory flange material.

A preferred method of building up the flanges employs the temporary addition of a surface-extension member which permits applied beads to overlap beyond the end surface of the roller. Ultimately, after building up the end band regions of the roller, the surface-extension member is cut off to provide a squared end.

According to this method, the solid steel mandrel is machined roughly to size if necessary followed by securing the narrow cylindrical member 57 to each end of the roller to extend the mandrel surface. Since the surface-extension member 57 usually will have a very limited heat sink due to the light weight construction, the first bead or two 58 near the seam 62 formed between member 57 and the end of the roller is put on at reduced temperature. Using submerged arc welding equipment, 325–350 amperes provides adequate heat. Enough beads 59 laterally adjacent to beads 58 are then applied to the roller surface to provide an end band of desired width, e.g. on the order of 1" in the above example. Softer welding material, e.g. the last noted material above, is used for this purpose. The end bands are further built up by a second layer of circumferential beads applied to overlay the first. The welding temperature need not be reduced for the second layer, however. Finally, enough additional end band layers of circumferential beads are applied to provide a band 60 of adequate depth. The surface-extension members are then cut off, although this step can be deferred until the roller has been completed with the further application of the harder beads 41', 45', 49' and 54'. Members 57 are removed by suitable cutting means 61 making a transverse cut substantially through the seam 62. Thus, at this stage of manufacture (FIG. 16), the mandrel includes a pair of raised end bands 60 which define an intermediate relieved portion 30'. Portion 30' can then be prepared with the improved and harder rolling surface applied according to the first described procedure outlined above, viz.:

(1) Applying a first and second layer of beads extending transversely to the mandrel axis, (2) Applying a third layer of beads lengthwise of the axis, (3) Applying a fourth layer of beads extending transversely to the axis, and (4) Machining or grinding the roller to a finished size (FIG. 17).

Therefore, while there have been shown and described and pointed out the fundamental novel features of the invention as applied to the preferred embodiments, it will be understood that various omissions and substitutions and changes in form and detail as well as in operation may be made by those skilled in the art, without departing from the spirit of the invention. For example, one layer of welding material can be formed wherein the beads are applied helically around the mandrel and an adjacent layer applied to include helical beads of an opposite hand. It is the intention, therefore, to be limited only as indicated by the scope of the following claims.

I claim:

1. The method of manufacturing a pressure roller comprising the steps of forming a pair of raised circumferential end flanges on the cylindrical exterior surface of a mandrel to define an intermediate axial extent of reduced diameter therebetween, applying a plurality of beads of a weld material contiguous to each other and disposed circumferentially around said intermediate axial extent to form a first layer of weld material around and axially co-extensive therewith, repeating the last said step to form a second layer of weld material, the beads of said second layer being disposed to substantially overlie the boundary between adjacent beads in said first layer, applying a plurality of contiguous beads of weld material disposed across the beads of said second layer to form a third layer of weld material co-extensive with said second layer, applying a plurality of beads of weld material to form a fourth layer thereof overlying said third layer and co-extensive therewith, the beads of said fourth layer being disposed to extend circumferentially around said intermediate axial extent, and the step of forming said fourth layer and said end flanges into a single continuous cylindrical surface.

2. The method of manufacturing a pressure roller as defined in claim 1 in which the welding material of said fourth layer is of greater hardness than the material of said flanges.

3. The method of manufacturing a pressure roller as defined in claim 2 wherein the step of forming a pair of circumferential end flanges on the cylindrical exterior surfaces of said mandrel includes the step of removing material substantially uniformly along an axial extent of said mandrel intermediate a narrow cylindrical band extending inwardly from each end thereof to reduce the diameter of said mandrel therebetween.

4. The method of manufacturing a pressure roller as defined by the method in claim 2 in which the step of forming a pair of circumferential end flanges includes the step of applying a plurality of contiguously adjacent beads of weld material to a narrow cylindrical band extending inwardly from each end of said mandrel, the beads of said bands extending circumferentially therearound.

5. The method of manufacturing a pressure roller as defined in claim 2 wherein the forming of said third layer includes the step of applying axially disposed beads of weld material alternately in opposite directions and in spaced apart relation through a plurality of revolutions of said mandrel until a layer of contiguous beads has been formed.

6. The method of manufacturing a pressure roller comprising the steps of forming a narrow raised flange at one end of a right circular cylindrical mandrel to define a predetermined axial extent therebetween, applying a plurality of overlying layers of welding material co-extensive with said extent, said layers being applied in the form of side by side beads of a welding material harder than said flange material, the beads of one layer being applied transverse to the beads of an adjacent layer, and smoothing the exterior applied layer and the flanges to form a single continuous right circular cylindrical rolling surface including each.

7. The method of manufacturing a pressure roller as in claim 6 wherein the step of forming the flanges includes the step of machining the cylindrical surface of said mandrel along said predetermined axial extent to remove the material thereof to a predetermined depth.

8. The method of manufacturing a pressure roller as in claim 6 wherein the step of forming the flanges includes the steps of extending the cylindrical surface of the mandrel at each end thereof, applying circumferential beads of welding material to said mandrel side by side to form a narrow band thereof extending axially along said cylindrical surface and onto the extended portion of same, and cutting through said bands in a plane transverse to the axis of said mandrel and axially disposed to substantially intersect the juncture between said mandrel and the extended portion of the surface of same.

9. In preparing a pressure roller with a cylindrical rolling surface the steps of welding to the roller a first plurality of beads in contiguous side by side relation to form a layer thereof around the roller, and welding a second plurality of beads in contiguous side by side relation overlying said layer to form another layer around the roller, the beads of one layer being disposed transversely to the beads of the other layer.

10. A pressure roller comprising a right cylindrical mandrel, a narrow cylindrical band of material formed around each end of said mandrel, said bands defining an intermediate cylindrical portion therebetween, said portion including a plurality of overlying layers co-extensive with said portion, each layer including a plurality of welding beads contiguous to each other, the beads of one layer extending transversely to the beads of an adjacent layer, the exterior one of said layers forming a smooth and continuous cylindrical surface with said bands.

11. A pressure roller as defined in claim 10 wherein the material of the exterior one of said layers is harder than the material of said bands.

12. A pressure roller as defined in claim 11 wherein one of said plurality of layers includes welding beads contiguous to each other extending transversely of the axis of said mandrel, the next adjacent layer exteriorly of the last said layer includes welding beads contiguous to each other extending substantially parallel to the axis of said mandrel, and an outermost layer adjacent the last named layer includes welding beads contiguous to each other and disposed to extend transversely of the axis of said mandrel, said outermost layer having a smooth right cylindrical surface continuous with said bands.

13. In a pressure roller having a cylindrical mandrel, a cylindrical rolling surface supported by said mandrel comprising a plurality of overlying layers of welding material in the form of beads, the beads of the two outermost layers being disposed transversely to each other, the outermost layer being smooth and forming a cylindrical rolling surface around said mandrel.

References Cited in the file of this patent

UNITED STATES PATENTS

| | | |
|---|---|---|
| 2,219,085 | Watson | Oct. 22, 1940 |
| 2,812,571 | Strom | Nov. 12, 1957 |
| 3,007,231 | Garver | Nov. 7, 1961 |
| 3,019,511 | Hornbostel | Feb. 6, 1962 |